United States Patent
Wang et al.

(10) Patent No.: US 10,415,249 B2
(45) Date of Patent: Sep. 17, 2019

(54) EPDM ROOFING MEMBRANES WITH EXPANDABLE GRAPHITE AS FLAME RETARDANT

(71) Applicant: FIRESTONE BUILDING PRODUCTS CO, LLC, Indianapolis, IN (US)

(72) Inventors: Hao Wang, Carmel, IN (US); Wensheng Zhou, Carmel, IN (US); Joseph Carr, Indianapolis, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 876 days.

(21) Appl. No.: 14/323,399

(22) Filed: Jul. 3, 2014

(65) Prior Publication Data
US 2016/0002929 A1    Jan. 7, 2016

(51) Int. Cl.
 *E04D 5/10* (2006.01)
 *C08K 3/04* (2006.01)
 (Continued)

(52) U.S. Cl.
 CPC ............... *E04D 5/10* (2013.01); *C08K 3/04* (2013.01); *E04D 5/00* (2013.01); *E04D 5/06* (2013.01); *C08L 2201/02* (2013.01)

(58) Field of Classification Search
 CPC .................................. E04D 5/10; C08K 3/04
 See application file for complete search history.

(56) References Cited

U.S. PATENT DOCUMENTS

| | | | | |
|---|---|---|---|---|
| 3,574,644 A | * | 4/1971 | Olstowski et al. | C08K 9/02 106/16 |
| 3,758,643 A | * | 9/1973 | Fischer | C08L 23/16 525/51 |

(Continued)

FOREIGN PATENT DOCUMENTS

| | | | |
|---|---|---|---|
| JP | H1036572 A | * | 7/1996 |
| WO | 2013/102208 A1 | | 7/2013 |

(Continued)

OTHER PUBLICATIONS

Sutanto, P., 2006. Development of a Continuous Process for EPDM Devulcanization in an Extruder. University Library Groningen][Host]. <https://core.ac.uk/download/pdf/12893443.pdf> (Year: 2006).*

(Continued)

*Primary Examiner* — Robert C Dye
*Assistant Examiner* — Nicholas R Krasnow
(74) *Attorney, Agent, or Firm* — Brian D. McAlhaney; Arthur M. Reginelli (57) ABSTRACT

A method of preparing an EPDM roofing membrane panel, the method comprising preparing a vulcanizable composition including expandable graphite by mixing an EPDM rubber and expandable graphite, forming a sheet from said vulcanizable composition, preparing a green membrane panel using said sheet, and curing said green membrane panel to form the EPDM roofing membrane panel, where said steps of preparing a vulcanizable composition, said step of forming a sheet, said step of preparing a green membrane, an said step of curing each include a peak temperature at which each of said steps respectively take place, and where the expandable graphite has an onset temperature above said peak temperature of each respective step.

2 Claims, 2 Drawing Sheets

(51) Int. Cl.
E04D 5/00 (2006.01)
E04D 5/06 (2006.01)

(56) References Cited

U.S. PATENT DOCUMENTS

| | | | | |
|---|---|---|---|---|
| 3,812,087 | A * | 5/1974 | Dillenschneider | B29D 23/001 525/331.8 |
| 4,102,855 | A * | 7/1978 | Kuan | C08L 23/16 524/522 |
| 4,128,523 | A * | 12/1978 | Britton | C08L 23/16 524/525 |
| 4,169,820 | A * | 10/1979 | Bock | C08L 23/32 524/322 |
| 4,735,988 | A * | 4/1988 | Takada | C08L 23/12 524/504 |
| 5,162,441 | A * | 11/1992 | Nakata | C08L 23/16 525/194 |
| 5,451,630 | A * | 9/1995 | Olivier | C10M 143/02 524/528 |
| 5,468,550 | A * | 11/1995 | Davis | C08L 23/16 428/327 |
| 5,506,308 | A * | 4/1996 | Ahmad | C08K 5/098 525/256 |
| 5,516,817 | A | 5/1996 | Slusher et al. | |
| 5,654,357 | A * | 8/1997 | Menashi | C09C 1/58 524/495 |
| 5,854,327 | A * | 12/1998 | Davis | C08J 5/18 524/445 |
| 5,968,669 | A | 10/1999 | Liu et al. | |
| 6,084,008 | A | 7/2000 | Liu | |
| 6,133,378 | A * | 10/2000 | Davis | C08L 23/04 524/401 |
| 6,207,085 | B1 | 3/2001 | Ackerman | |
| 6,410,122 | B1 * | 6/2002 | Tono | B32B 13/14 428/212 |
| 6,515,044 | B1 * | 2/2003 | Idel | C08J 3/226 523/351 |
| 6,515,059 | B1 * | 2/2003 | Davis | C08J 11/10 524/426 |
| 6,544,596 | B2 | 4/2003 | Clemens et al. | |
| 6,706,793 | B2 | 3/2004 | Abu-Isa et al. | |
| 6,800,691 | B2 * | 10/2004 | Graf | C08L 23/16 524/425 |
| 6,849,338 | B2 | 1/2005 | Clemens et al. | |
| 7,605,188 | B2 | 10/2009 | Loh et al. | |
| 7,677,009 | B2 | 3/2010 | Bowman | |
| 7,833,575 | B2 | 11/2010 | Gupta | |
| 7,878,301 | B2 | 2/2011 | Gross et al. | |
| 8,178,449 | B2 | 5/2012 | La Vietes et al. | |
| 9,611,639 | B2 * | 4/2017 | Wang | C08K 3/04 |
| 2003/0125447 | A1 * | 7/2003 | Hoch | C08K 3/04 524/495 |
| 2003/0139492 | A1 | 7/2003 | Abu-Isa | |
| 2004/0121152 | A1 | 6/2004 | Toas | |
| 2004/0148112 | A1 * | 7/2004 | Manaka | G01N 11/16 702/42 |
| 2004/0172899 | A1 * | 9/2004 | Paradise | C08L 95/00 52/302.1 |
| 2004/0256605 | A1 * | 12/2004 | Reinheimer | C08K 9/02 252/606 |
| 2005/0139126 | A1 | 6/2005 | Khan et al. | |
| 2005/0145139 | A1 * | 7/2005 | Khan | C04B 26/02 106/437 |
| 2005/0257875 | A1 | 11/2005 | Khan et al. | |
| 2005/0288394 | A1 | 12/2005 | Rothman et al. | |
| 2006/0144012 | A1 | 7/2006 | Manning et al. | |
| 2006/0160978 | A1 | 7/2006 | Gupta et al. | |
| 2006/0173089 | A1 * | 8/2006 | Jackson | C08L 23/00 522/109 |
| 2006/0191232 | A1 | 8/2006 | Salazar et al. | |
| 2006/0217451 | A1 | 9/2006 | Bonapersona | |
| 2006/0225618 | A1 | 10/2006 | Guevara et al. | |
| 2006/0240224 | A1 | 10/2006 | Khan et al. | |
| 2006/0246368 | A1 * | 11/2006 | Matsumoto | C08J 3/226 430/109.2 |
| 2006/0273290 | A1 | 12/2006 | Khan et al. | |
| 2007/0155890 | A1 * | 7/2007 | Chen | B60C 1/00 524/493 |
| 2007/0166454 | A1 | 7/2007 | Gupta | |
| 2007/0208135 | A1 * | 9/2007 | Gervat | C08L 21/00 525/88 |
| 2008/0097043 | A1 | 4/2008 | Tong | |
| 2008/0102243 | A1 * | 5/2008 | Gupta | B32B 27/18 428/41.8 |
| 2008/0184642 | A1 | 8/2008 | Sebastian et al. | |
| 2008/0188590 | A1 | 8/2008 | Gupta | |
| 2009/0090074 | A1 | 4/2009 | Klein | |
| 2009/0171000 | A1 * | 7/2009 | Amemiya | C08K 5/14 524/449 |
| 2009/0309077 | A1 | 12/2009 | Gupta et al. | |
| 2009/0326117 | A1 | 12/2009 | Benussi et al. | |
| 2010/0080920 | A1 | 4/2010 | Lagrange et al. | |
| 2010/0167013 | A1 | 7/2010 | Cruz et al. | |
| 2010/0273902 | A1 | 10/2010 | Ladely et al. | |
| 2010/0320030 | A1 | 12/2010 | Ogawa et al. | |
| 2011/0002998 | A1 | 1/2011 | Ishaque et al. | |
| 2011/0015290 | A1 | 1/2011 | Schmitz et al. | |
| 2011/0034577 | A1 * | 2/2011 | Peng | C08J 9/0061 521/140 |
| 2011/0065840 | A1 | 3/2011 | Freidank et al. | |
| 2011/0185656 | A1 | 8/2011 | Klein | |
| 2011/0247215 | A1 | 10/2011 | Schmidt et al. | |
| 2011/0311793 | A1 | 12/2011 | Burgess et al. | |
| 2011/0313084 | A1 | 12/2011 | Furar et al. | |
| 2012/0009407 | A1 | 1/2012 | Peeler et al. | |
| 2012/0022176 | A1 | 1/2012 | Stahl et al. | |
| 2012/0045623 | A1 | 2/2012 | Delaney et al. | |
| 2012/0100289 | A1 | 4/2012 | Egan et al. | |
| 2012/0142240 | A1 | 6/2012 | Eling et al. | |
| 2012/0174508 | A1 | 7/2012 | Brooks et al. | |
| 2012/0189838 | A1 | 7/2012 | Pellacani et al. | |
| 2012/0264843 | A1 | 10/2012 | Glos | |
| 2012/0266553 | A1 | 10/2012 | Shiao et al. | |
| 2013/0036714 | A1 | 2/2013 | Bolton et al. | |
| 2014/0013693 | A1 | 1/2014 | Zhou et al. | |
| 2014/0127443 | A1 | 5/2014 | Zhou et al. | |
| 2014/0141672 | A1 | 5/2014 | Hubbard et al. | |
| 2014/0205789 | A1 | 7/2014 | Zhou et al. | |
| 2014/0215937 | A1 | 8/2014 | Zhou et al. | |
| 2014/0345886 | A1 * | 11/2014 | Yano | C08K 13/02 169/56 |
| 2014/0373467 | A1 * | 12/2014 | Wang | C08K 3/04 52/232 |
| 2015/0184036 | A1 | 7/2015 | Zhou et al. | |
| 2015/0307748 | A1 | 10/2015 | Zhou et al. | |
| 2015/0376379 | A1 * | 12/2015 | Krasnow | A01N 59/20 524/321 |
| 2016/0122542 | A1 * | 5/2016 | Zhou | C08L 95/00 521/60 |

FOREIGN PATENT DOCUMENTS

WO 2014074689 A1 5/2014
WO 2015/013176 A1 1/2015

OTHER PUBLICATIONS

"Idris"—Wan Idris, W.Y., 1978. Dispersion of particulate additives in rubber using the batch operated internal mixer: a study of flow behaviour and properties of rubber mixes <https://dspace.lboro.ac.uk/dspace-jspui/bitstream/2134/10466/1/Thesis-1978-Wanldris.pdf> (Year: 1978).*

"Ko"—Ko, M.B., Jho, J.Y., Jo, W.H. and Lee, M.S., 2002. Effect of matrix viscosity on clay dispersion in preparation of polymer/organoclay nanocomposites. Fibers and Polymers, 3(3), pp. 103-108. <https://link.springer.com/content/pdf/10.1007%2FBF02892625.pdf> (Year: 2002).*

"Besco"—Besco, S. 2014. Influence of melt viscosity on the structure and properties of electrically conductive nanocomposites pro- (56) References Cited

OTHER PUBLICATIONS duced by masterbatch process. Macromolecular Materials and Engineering, 299(7), pp. 814-824. <https://onlinelibrary.wiley.com/doi/epdf/10.1002/mame.201300336> (Year: 2014).*

Clariant—https://www.clariant.com/~/media/Files/Business-Units/Masterbatches/Brochures/Color-Masterbatches/Fundamentals_of_Color_and_Additives.pdf (Year: 2013).*

Ashbury—https://web.archive.org/web/20131112051000/http://asbury.com/technical-presentations-papers/materials-in-depth/expandable-flake-graphite/ (Year: 2013).*

Tadmor, Z. and Gogos, C.G., 2006. Principles of polymer processing. p. 322-381 (Year: 2006).*

Tavernier, Bruno, Influence of Processing Conditions on the Structure Development in PEBAX. Dissertation 2009. <https://core.ac.uk/download/pdf/34435960.pdf> (Year: 2009).*

Improved translation of JPH1036572 (A)—Feb. 10, 1998 (Year: 1998).*

Groover, M.P., 2010. Fundamentals of Modern Manufacturing: Materials, Processes, and Systems. John Wiley & Sons. Chapter 14 (Year: 2010).*

International Search Report and Written Opinion of PCT/US2015/038547 dated Nov. 5, 2015.

\* cited by examiner

EPDM ROOFING MEMBRANES WITH EXPANDABLE GRAPHITE AS FLAME RETARDANT

FIELD OF THE INVENTION

The present invention relates generally to polymeric sheeting materials, such as EPDM membranes, for roofing applications, that include expandable graphite as a flame retardant.

BACKGROUND OF THE INVENTION

Ethylene-propylene-diene terpolymer (EPDM) is extensively used in a variety of applications. For example, it is particularly useful as a polymeric sheeting material that, because of its physical properties, flexibility, weathering resistance, low temperature properties and heat aging resistance, has gained acceptance as a roofing membrane for covering industrial and commercial roofs. These rubber roofing membranes are typically applied to the roof surface in a vulcanized or cured state and serve as an effective barrier to prevent the penetration of moisture to the covered roof.

These roofing membranes are typically prepared by compounding the base polymer of EPDM with appropriate fillers, processing oils, and other desired ingredients such as plasticizers, antidegradants, adhesive-enhancing promoters, etc., in a suitable mixer, and calendering the resulting compound into the desired thickness. The roofing membrane may also be cured by vulcanizing the resultant sheet in the presence of one or more vulcanizing agents and/or compatible vulcanizing accelerators.

Mineral fillers such as clay, talc, silicas, mica, calcium carbonate, and the like are typically added to a roofing membrane formulation to increase burn resistivity, such as described in U.S. Pat. No. 5,468,550.

Roofing membranes typically also include flame retardants (FR). Decabromodiphenyl oxide (DBDPO) is a well-known halogen-containing FR used in EPDM roofing membranes. However, DBDPO has become an environmental concern due to its high bromine content (83 wt %). Due to these concerns, and also to address regulatory changes in the industry, there exists a need for DBDPO-free polymeric compositions, which also provide flame retardant properties.

There is an ongoing desire to find materials that are useful as flame retardants within rubber roofing membranes and that do not have a deleterious impact on the rubber roofing membranes.

SUMMARY OF THE INVENTION

One or more embodiments of the present invention provide a method of preparing an EPDM roofing membrane panel, the method comprising preparing a vulcanizable composition including expandable graphite by mixing an EPDM rubber and expandable graphite, forming a sheet from said vulcanizable composition, preparing a green membrane panel using said sheet, and curing said green membrane panel to form the EPDM roofing membrane panel, where said steps of preparing a vulcanizable composition, said step of forming a sheet, said step of preparing a green membrane, an said step of curing each include a peak temperature at which each of said steps respectively take place, and where the expandable graphite has an onset temperature above said peak temperature of each respective step.

DETAILED DESCRIPTION OF ILLUSTRATIVE EMBODIMENTS

Embodiments of the present invention are based upon the discovery of EPDM roofing membranes that include expandable graphite as a flame retardant. Advantageously, the membranes of one or more embodiments meet the performance standards as set forth in UL 94 and UL 790 even though the membranes are substantially devoid of halogen-containing flame retardants. Additionally, the EPDM membranes of one or more embodiments of the invention advantageously meet the performance standards of ASTM D 4637. Embodiments of the invention also provide unique methods for the productions of EPDM membrane including expandable graphite.

Membrane Construction

In one or more embodiments, the membranes of the present invention include cured rubber, expandable graphite, a filler, and an extender. Additionally, these membranes, which may be black or non-black, may include other constituents that are employed in rubber membranes or rubber compounds. The membranes include a cured network deriving from a vulcanizable rubber composition. The various other ingredients, including the expandable graphite, may be dispersed throughout the cured network. The membrane may also be referred to as a sheet. The membrane may further comprise fabric reinforcement. In certain embodiments, the membranes are devoid of halogen-containing flame retardants.

In one or more embodiments, the EPDM membrane employed in practice of the present invention includes a cured sheet of ethylene-propylene-diene copolymer rubber (EPDM). Dispersed within the crosslinked network of ethylene-propylene-diene copolymer may be various additives including, but not limited to, filler, oil, wax, antioxidant, antiozonant, flame retardant (e.g., expandable graphite), and the like. The EPDM sheet may be a single-ply sheet or a multi-ply sheet. The EPDM sheet may be devoid of fabric reinforcement or it may include a fabric reinforcement positioned between two or more plies or layers of rubber.

In one or more embodiments, the membranes, although commonly referred to as single-ply roofing membranes, may include two or more layers that are compositionally distinct. The layers may be formed by calendering. For example, first and second sheets may be formed from first and second respective rubber compositions, and then the respective sheets can be mated and further calendered or laminated to one another, optionally with a reinforcing fabric therebetween, and then ultimately cured. The skilled person will recognize, however, that these layers may be integral to the extent that the calendering and/or curing process creates an interface, at some level, and the layers are generally inseparable. Nonetheless, reference can be made to the individual layers, especially where the layers derive from distinct compositions. Reference may also be made a multi-layered sheet.

In one or more embodiments, each layer of a multi-layered membrane or sheet may include expandable graphite according to the present invention. In other embodiments, a first layer may include expandable graphite and a second is devoid or substantially devoid of expandable graphite. Substantially devoid refers to the absence of that amount of expandable graphite that would otherwise have an appreciable impact on practice of the present invention. For example, in one embodiment, the membrane of the invention is a calendered sheet wherein a first composition including expandable graphite is calendered to form a first layer of the membrane, and a second composition that devoid or substantially devoid of expandable graphite is calendered to form a second layer of the membrane. In particular embodiments, reference may be made to the weathering layer and the bottom layer. As the skilled person will appreciate, the weathering layer is that layer exposed to the environment when the membrane is installed, and the bottom layer is the opposite surface, which is adjacent to the substrate on which the membrane is installed. In particular embodiments, the expandable graphite is contained in the weathering layer. In other embodiments, the expandable graphite is contained in the bottom layer, and the weathering layer is substantially devoid of expandable graphite. In other embodiments, the weathering layer is devoid of expandable graphite.

In one or more embodiments, the membranes of the present invention are two-layered membranes, wherein the first layer of the membrane is black in color and the second layer is non-black in color (e.g. white or generally white). As those skilled in the art appreciate, the black layer can derive from a black composition that would generally include carbon black as a filler. The black layer includes expandable graphite as contemplated by the present invention. The white layer can derive from a white composition that would generally include non-black fillers such as silica, titanium dioxide, and/or clay. The white layer is devoid of expandable graphite. White EPDM membranes or membranes having a white EPDM layer are known in the art as disclosed in U.S. Ser. No. 12/389,145, which is incorporated herein by reference.

Figure 1:
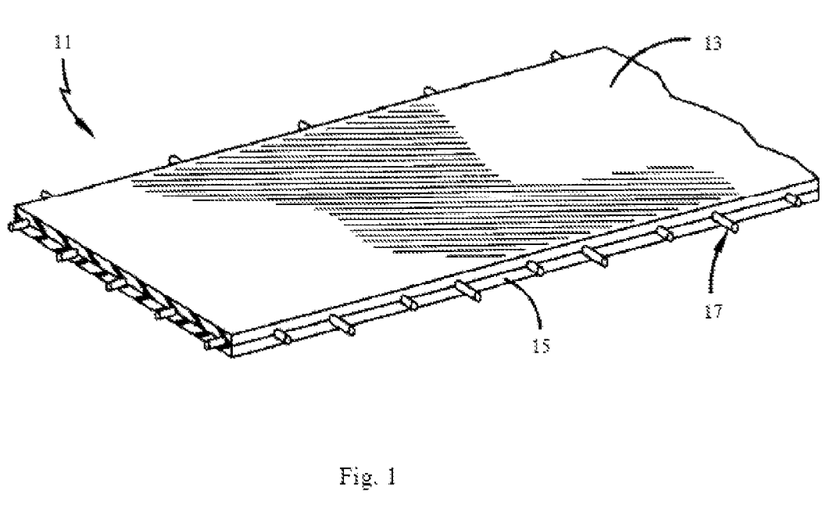
FIG. 1 is a perspective, cross-sectional view of an EPDM membrane according to embodiments of the invention.

An exemplary EPDM sheet according to embodiments of the invention is shown in FIG. 1. Sheet 11, which may also be referred to as panel 11, is a multi-layered sheet including first layer 13 and second layer 15. An optional reinforcing fabric 17 is disposed (e.g., sandwiched) between first layer 13 and second layer 15. Layers 13 and 15 may be calendared and co-cured, thereby providing an integral interface between the layers. In one or more embodiments, the expandable graphite is included within first layer 13 and second layer 15. In other embodiments, first layer 13 is the weathering layer and may be non-black in color. In this embodiment, first layer 13 is devoid or substantially devoid of expandable graphite. In these or other embodiments, second layer 15 is the bottom layer and may be black in color and include the expandable graphite.

Generally, the thickness of the sheet ranges from about 20 to about 100 mils, in other embodiments from about 35 to about 95 mils, and in other embodiments from about 45 to about 90 mils. In one or more embodiments, the EPDM sheet meets the performance standards of ASTM D4637.

Useful EPDM membrane is disclosed in, for example, U.S. Pat. Nos. 7,175,732, 6,502,360, 6,120,869, 5,849,133, 5,389,715, 4,810,565, 4,778,852, 4,732,925, and 4,657,958, which are incorporated herein by reference, as well as U.S. Ser. No. 12/982,198, which is incorporated herein by reference. EPDM membranes are commercially available from a number of sources; examples include those available under the tradenames RubberGard (Firestone Building Products) and SURE-SEAL (Carlisle SynTec).

EPDM

In one or more embodiments, the cured rubber derives from an olefinic rubber such as an olefinic terpolymer. In one or more embodiments, the olefinic terpolymer includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1, 5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publ. Appl. No. 2006/0280892, both of which are incorporated herein by reference. Furthermore, olefinic terpolymers and methods for their manufacture as related to non-black membranes are known as disclosed in co-pending U.S. application Ser. Nos. 12/389,145, 12/982,198, and 13/287,417, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, mer units deriving from diene monomer; in these or other embodiments, the elastomeric terpolymer may include at most 4 weight percent, and in other embodiments at most 3.2 weight percent, mer units deriving from diene monomer. In one or more embodiments, the balance of the mer units derive from propylene or other α-olefins.

As is known in the art, it is within the scope of the present invention to blend low Mooney EPDM terpolymers with high Mooney EPDM terpolymers to reduce the overall viscosity of the membrane compound. In other words, EPDM terpolymers with different molecular weights may be utilized to accommodate processing.

In one or more embodiments, the crosslinked network of EPDM (which forms a matrix in which the other constituents including the expandable graphite are dispersed) may derive directly from the curing or vulcanization (e.g., sulfur crosslinking) of a vulcanizable composition including EPDM polymer. Multiple EPDM polymers of different type (e.g. size and crystallinity) may be included. In one or more embodiments, at least one EPDM polymer may be characterized by a Mooney viscosity ($ML_{1+4}$@125° C.) of less than 60, in other embodiments less than 55, and in other embodiments less than 50, in other embodiments less than 45, in other embodiments less than 40, in other embodiments less than 35, and in other embodiments less than 30. In one or more embodiments, the one or more layers of the membranes of the present invention that include expandable graphite may derive directly from the vulcanization (e.g., sulfur crosslinking) of a vulcanizable composition including a rubber component that includes from about 2 to about 40 wt. %, in other embodiments from about 3 to about 20 wt. %, and in other embodiments from about 5 to about 12 wt. % of an EPDM characterized by a Mooney viscosity of less than 60, in other embodiments less than 55, in other embodiments less than 50, in other embodiments less than 45, in other embodiments less than 40, in other embodiments less than 35, with the balance of the rubber component including EPDM characterized by a Mooney viscosity of 60 or higher. The skilled person will appreciate that where the expandable graphite is included within one layer of a multi-layered panel, reference to the amount of the low Mooney EPDM may be with respect to the EPDM within that specific layer having the expandable graphite present therein.

As is known in the art, the rubber may be cured with a curative or cure system including those disclosed in U.S. Publ. Appl. No. 2006/0280892, incorporated herein by reference. The elastomeric terpolymers (e.g. EPDM) can be cured by using numerous techniques such as those that employ sulfur cure systems, peroxide cure systems, and quinone-type cure systems. The sulfur cure systems may be employed in combination with vulcanizing accelerators.

In one or more embodiments, the sulfur cure systems may be employed in combination with vulcanizing accelerators. Useful accelerators include thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-di-isopropyl-2-benzothiazolesulfenamide, N-tert-butyl-2-benzothiazole sulfenamide (TBBS) (available as Delac® NS from Chemtura, Middlebury, Conn.) and the like; other thiazole accelerators such as 2-mercaptobenzothiazole (MBT), benzothiazyl disulfide (MBTS), N,N-diphenylguanidine, N,N-di-(2-methylphenyl)-guanidine, 2-(morpholinodithio)benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, sodium butyldithiocarbamate, zinc diethyldithiocarbamate, zinc dimethyldithiocarbamate, zinc dibutyldithiocarbamate (ZDBDC) and mixtures thereof. Sulfur donor-type accelerators (e.g. dimorpholino disulfide and alkyl phenol disulfide) may be used in place of elemental sulfur or in conjunction with elemental sulfur if desired.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoye peroxide, phenylacetyl peroxide, and mixtures thereof.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and mixtures thereof.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2-4. Examples of organic polysulfides are disclosed in U.S. Pat. No. 2,619,481, which is incorporated herein by reference.

Conventional radiation equipment and techniques can also be employed in the practice of this invention. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition, they may also function to reduce the dosage of ionizing radiation needed to obtain the desired level of crosslinking.

Sulfur and sulfur-containing cure systems may be used, and may also be used with an accelerator. Suitable amounts of sulfur can be readily determined by those skilled in the art. In one or more embodiments roughly about 1 part by weight (pbw) sulfur per 100 parts by weight rubber (phr) may be used. The amount of accelerator can also be readily determined by those skilled in the art.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, in other embodiments at most 6.5, in other embodiments at most 6, and in other embodiments at most 5.

In one or more embodiments, the expandable graphite may be characterized by an onset temperature ranging from about 100° C. to about 280° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., in other embodiments at least 170° C., in other embodiments at least 180° C., in other embodiments at least 190° C., and in other embodiments at least 200° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; it may also be referred to as the temperature at which expansion of the graphite starts.

Complementary Flame Retardants

As mentioned above, the expandable graphite may be used in conjunction with a complementary flame retardant. Flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate. Useful flame retardants in the present invention include expandable graphite.

Filler

As mentioned above, the membranes of the present invention include filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

In lieu of or in addition to the use of carbon black, the vulcanizable compositions may include inorganic fillers. Useful inorganic fillers include, but are not limited to, clay, mica, and talc, such as those disclosed in U.S. Publ. Appl. No. 2006/0280892, which is incorporated herein by reference. Still other useful fillers include silica, which may be used in conjunction with a coupling agent.

Extenders

As mentioned above, the membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 550° F. Useful extenders are commercially available. One particular extender is a paraffinic oil available under the tradename SUNPAR™ 2280 (Sun Oil Company). Another useful paraffinic process oil is Hyprene P150BS, available from Ergon Oil Inc. of Jackson, Miss.

Other Constituents

In addition to the foregoing constituents, the membranes of this invention may also optionally include mica, coal filler, ground rubber, titanium dioxide, calcium carbonate, silica, homogenizing agents, phenolic resins, flame retardants, zinc oxide, stearic acid, and mixtures thereof as disclosed in U.S. Publ. Appl. No. 2006/0280892, which is incorporated herein by reference. Certain embodiments may be substantially devoid of any of these constituents.

Amounts

In one or more embodiments, the polymeric membranes of this invention include from about 20 to about 50, in other embodiments from about 24 to about 36, and in other embodiments from about 28 to about 32% by weight rubber (e.g., EPDM) based on the entire weight of the membrane.

In one or more embodiments, the polymeric membranes of this invention include at least one layer that includes from about 1 to about 50, in other embodiments from about 2 to about 40, in other embodiments from about 3 to about 35, in other embodiments from about 5 to about 30, and in other embodiments from about 7 to about 25 parts by weight (pbw) expandable graphite per 100 parts by weight rubber (phr) (e.g., EPDM). In certain embodiments, the polymeric membranes of this invention include at least one layer that includes at most 50 pbw, in other embodiments at most 40 pbw, in other embodiments at most 35 pbw, in other embodiments at most 30 pbw, in other embodiments at most 25 pbw, in other embodiments at most 20 pbw, and in other embodiments at most 15 pbw expandable graphite phr. In these or other embodiments, the polymeric membranes of this invention includes at least one layer that includes at least 2 pbw, in other embodiments at least 3 pbw, in other embodiments at least 5 pbw, in other embodiments at least 7 pbw, in other embodiments at least 10 pbw, in other embodiments at least 15 pbw, and in other embodiments at least 20 pbw expandable graphite phr.

In one or more embodiments, the polymeric membranes of this invention include at least one layer that includes from about 50 to about 120, in other embodiments from about 60 to about 115, in other embodiments from about 70 to about 110, and in other embodiments from about 80 to about 105 parts by weight (pbw) inorganic filler (e.g. clay) per 100 parts by weight rubber (phr) (e.g., EPDM). In certain embodiments, the polymeric membranes of this invention include at least one layer that includes at most 120 pbw, in other embodiments at most 115 pbw, in other embodiments at most 110 pbw, in other embodiments at most 105 pbw, and in other embodiments at most 100 pbw, inorganic filler phr. In these or other embodiments, the polymeric membranes of this invention includes at least one layer that includes at least 50 pbw, in other embodiments at least 60 pbw, in other embodiments at least 70 pbw, in other embodiments at least 80 pbw, and in other embodiments at least 90 pbw inorganic filler phr.

In one or more embodiments, the polymeric membranes of this invention may include from about 70 to about 100 pbw, in other embodiments from about 75 to about 95 pbw, and in other embodiments from about 77 to about 85 parts by weight carbon black per 100 pbw phr. Certain embodiments may be substantially devoid of carbon black.

In one or more embodiments, the polymeric membranes of this invention may include from about 78 to about 103 pbw, in other embodiments from about 85 to about 100 pbw, and in other embodiments from about 87 to about 98 pbw clay per 100 pbw phr. Certain embodiments may be substantially devoid of clay.

In one or more embodiments, the polymeric membranes of this invention may include from 5 to about 60 pbw, in other embodiments from about 10 to about 40 pbw, and in other embodiments from about 20 to about 25 pbw talc per 100 pbw phr. Certain embodiments may be substantially devoid of talc.

In one or more embodiments, the polymeric membranes of this invention may include from about 55 to about 95 pbw, in other embodiments from about 60 to about 85 pbw, and in other embodiments from about 65 to about 80 pbw extender per 100 pbw phr. Certain embodiments may be substantially devoid of extender.

In one or more embodiments, the membranes of this invention may include from about 12 to about 25 pbw mica per 100 pbw phr. In other embodiments, the membrane includes at most 12 pbw phr mica, and in other embodiments at most 6 pbw mica phr. In certain embodiments, the membrane is devoid of mica.

In one or more embodiments, the membranes of this invention may include from about 10 to about 100 pbw silica phr. In other embodiments, the membrane includes at most 70 pbw silica phr, and in other embodiments at most 55 pbw silica phr. In certain embodiments, the membrane is devoid of silica.

In one or more embodiments, the membranes of this invention include from about 2 to about 10 pbw homogenizing agent phr. In other embodiments, the membrane includes at most 5 pbw homogenizing agent phr, and in other embodiments at most 3 pbw homogenizing agent phr. In certain embodiments, the membrane is devoid of homogenizing agent.

In one or more embodiments, the membranes of this invention include from about 2 to about 10 pbw phenolic resin phr. In other embodiments, the membrane includes less than 4 pbw phenolic resin phr, and in other embodiments less than 2.5 pbw phenolic resin phr. In certain embodiments, the membrane is devoid of phenolic resin.

In one or more embodiments, the membranes of this invention (or one or more layers of a multi-layered membrane) including expandable graphite are devoid or substantially devoid of halogen-containing flame retardants. In one or more embodiments, the membranes or the layers of a membrane including expandable graphite include less than 5 pbw, in other embodiments less than 1 pbw, and in other embodiments less than 0.1 pbw halogen-containing flame retardant phr. In particular embodiments, the membranes of the present invention are substantially devoid of DBDPO.

SPECIFIC EMBODIMENTS

Reference can be made to FIG. 1 to describe specific embodiments of the invention. In certain embodiments, the membranes panels of the invention include two sheets of EPDM laminated and co-cured to one another, optionally with a fabric disposed between the layers. As shown in FIG. 1, this may include top layer 13 and bottom layer 15. As described above, in certain embodiments top layer 13 is devoid or substantially devoid of expandable graphite and bottom layer 15 includes expandable graphite. In one or more embodiments, it has advantageously been discovered that an EPDM membrane panel can be constructed that satisfies the requirements of a Class A system according to UL-790 when the membrane panel includes from about 0.5 to about 5, in other embodiments from about 1 to about 4.5, in other embodiments from about 1.5 to about 4.0, and in other embodiments from about 2.0 to about 3.5 parts by weight expandable graphite per 100 parts EPDM rubber in the bottom layer when the expandable graphite is dispersed in the bottom layer together with an inorganic filler. In one or more embodiments, the inorganic filler (e.g. clay) is present in the bottom layer in amount from about 50 to about 115, and in other embodiments from about 60 to about 110, and in other embodiments from about 70 to about 100 parts by weight inorganic filler per 100 parts EPDM rubber in the bottom layer.

Methods of Manufacture

In one or more embodiments, the EPDM roofing membranes of the present invention can be prepared by employing conventional techniques including those described in U.S. Pat. Nos. 6,632,509, 6,515,059, 5,854,327, 5,700,538, 5,582,890, 5,512,118, 5,486,550, and 5,407,989, which are incorporated herein reference. In one or more embodiments, continuous processes for the production of EPDM membrane sheet may also be employed including those described in U.S. Pat. No. 6,093,354, which is incorporated herein by reference.

Figure 2:
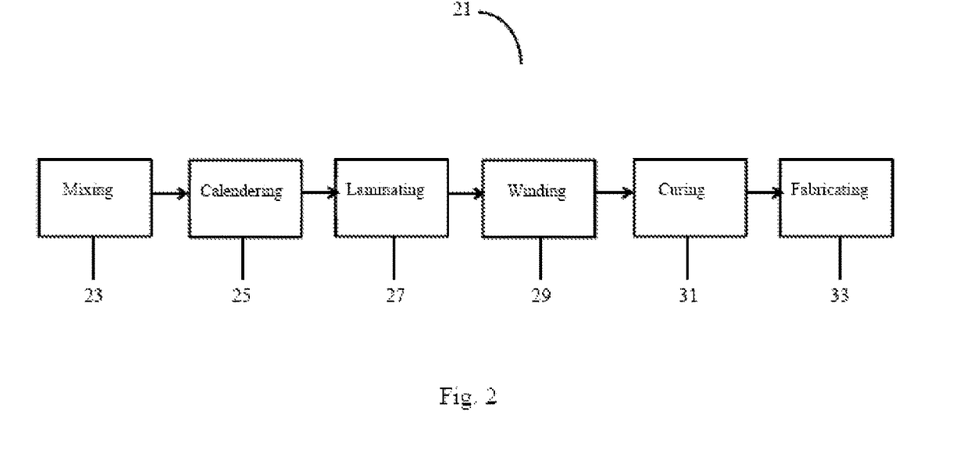
FIG. 2 is a flow chart describing a process for making an EPDM membrane according to embodiments of the invention.

A process for preparing EPDM membrane sheet according to the present invention can be described with reference to FIG. 2. Process 21 may begin by preparing a vulcanizable composition within a mixing step 23. This vulcanizable composition can then be prepared into a sheet material within, for example, a calendaring step 25. Following formation of the sheet, two or more layers may be laminated to form a laminated product, optionally by inclusion of a reinforcing scrim between the layers, within a laminating step 27. The laminated product may then be wound within a winding step 29 to produce an uncured, wound membrane ready for vulcanization. Vulcanization may take place within a curing step 31. Once cured, the membrane may undergo final fabrication within fabricating step 33.

Preparation of the vulcanizable mixture within mixing step 23 may take place within conventional rubber compounding equipment such as Brabender, Banbury, Sigma-blade mixer, two-roll mill, extruders, or other mixers suitable for forming viscous, relatively uniform admixtures. In one or more embodiments, the ingredients can be added together in a single shot. In other embodiments, some of the ingredients, such as fillers, oils, etc., can be loaded first followed by the polymer. In other embodiments, the polymer is added first followed by the other ingredients. Mixing cycles generally range from about 2 to 6 minutes. In certain embodiments an incremental procedure can be used whereby the base polymer and part of the fillers are added first with little or no process oil, the remaining fillers and process oil are added in additional increments. In other embodiments, part of the EPDM can be added on top of the fillers, plasticizers, etc. This procedure can be further modified by withholding part of the process oil, and then adding it later. In one or more embodiments, two-stage mixing can be employed.

In certain embodiments, such as when utilizing a type B Banbury internal mixer, the dry or powdery materials such as the carbon black and non-black mineral fillers (i.e., untreated clay, treated clays, talc, mica, and the like) can be added first, followed by the liquid process oil and finally the polymer (this type of mixing can be referred to as an upside-down mixing technique). In these or other embodiments, all of the non-rubber ingredients, including the expandable graphite, are added first to the mixer. The rubber (i.e. EPDM rubber) is added on top of these ingredients, and then mixing is initiated. In these embodiments, mixing takes place under sufficient heat and mixing energy to achieve an internal composition temperature of at least 120° C., in other embodiments at least 130° C., in other embodiments at least 140° C., and in other embodiments at least 150° C. In these or other embodiments, mixing takes place under sufficient heat and mixing energy to achieve an internal composition temperature of at most 180° C., in other embodiments at most 175° C., in other embodiments at most 170° C., in other embodiments at most 165° C., in other embodiments at most 160° C., and in other embodiments at most 155° C.

In certain embodiments, blends of different Mooney viscosity EPDM rubber may be employed. For example, and as provided above, the blend may include from about 2 to about 40 wt. %, in other embodiments from about 3 to about 20 wt. %, and in other embodiments from about 5 to about 12 wt. % of an EPDM characterized by a Mooney viscosity of less than 60, in other embodiments less than 55, in other embodiments less than 50, in other embodiments less than 45, in other embodiments less than 40, in other embodiments less than 35, with the balance of the rubber component including EPDM characterized by a Mooney viscosity of 60 or higher.

In certain embodiments, a sequential addition of the ingredients takes place where the rubber, oils, and conventional fillers (e.g., carbon black, silica, etc.) are first mixed, and then the expandable graphite is added to the mixture (i.e., a masterbatch is formed and the expandable graphite is then subsequently added to the masterbatch).

In one or more embodiments, the mixing temperatures are manipulated based upon the presence of the expandable graphite. For example, where a masterbatch is prepared in the absence of expandable graphite, mixing may take place at temperatures (i.e., the internal temperature of the materials) of at least 150° C., in other embodiments at least 150° C., in other embodiments at least 155° C., and in other embodiments 160° C.

In certain embodiments, the expandable graphite is pre-blended or pre-dispersed into EPDM rubber (or in certain embodiments a complementary rubber such as EPR). In certain embodiments, the expandable graphite is pre-blended with a low Mooney EPDM, such as an EPDM having a Mooney viscosity ($ML_{1+4}$@125° C.) of less than 60, in other embodiments less than 55, and in other embodiments less than 50, in other embodiments less than 45, in other embodiments less than 40, and in other embodiments less than 35. The concentration of the expandable graphite within this pre-blend may be from about 20 to about 70, in other embodiments from about 30 to about 60, and in other embodiments from about 40 to about 55 parts by weight expandable graphite per 100 parts by weight low Mooney EPDM.

Following this initial mixing, the masterbatch can be cooled to temperatures below 160° C., in other embodiments below 140° C., and in other embodiments below 130° C., which may take place by dropping the masterbatch from the mixer. Once cooled, the composition can be again charged to a mixing apparatus and combined with the expandable graphite. Mixing in the presence of expandable graphite may take place at temperatures below 160° C., in other embodiments below 155° C., in other embodiments below 150° C., and in other embodiments below 145° C. In one or more embodiments, mixing in the presence of expandable graphite may take place at temperatures of from about 120 to about 155, or in other embodiments from about 130 to about 150° C.

After mixing the expandable graphite into the rubber composition, preparation of the vulcanizable composition can then be completed by the addition and subsequent mixing with the cure system. Prior to adding the cure system to the vulcanizable composition, the vulcanizable composition can be cooled to temperatures below 130° C., in other embodiments below 115° C., and in other embodiments below 100° C. As above, cooling may take place by dropping the mixture from the mixer. The cure system is then added, and mixing may then continue in the presence of the cure system at temperatures below 150° C., in other embodiments below 130° C., in other embodiments below 115° C., and in other embodiments below 100° C.

In yet other embodiments, the mixing procedure employed includes the preparation of first and second vulcanizable compositions that are distinct based upon the presence and absence of expandable graphite. For example, a first vulcanizable composition can be prepared that includes expandable graphite, and a second vulcanizable composition can be prepare the excludes expandable graphite. Prior to calendering, the first and second vulcanizable compositions can be combined and mixed, which may take place in an apparatus such as a mill or extruder. This technique advantageously allows the composition containing the expandable graphite to be processed differently. For example, the composition containing the expandable graphite can be mixed at temperature of at least 120° C., in other embodiments at least 130° C., in other embodiments at least 140° C., and in other embodiments at least 150° C. In these or other embodiments, mixing of the composition including the expandable graphite can take place under sufficient heat and mixing energy to achieve an internal composition temperature of at most 180° C., in other embodiments at most 175° C., in other embodiments at most 170° C., in other embodiments at most 165° C., in other embodiments at most 160° C., and in other embodiments at most 155° C. The vulcanizable composition that is devoid or substantially devoid of expandable graphite can be mixed to achieve a higher internal compositional temperature. Likewise, this technique affords the opportunity to employ different types or blends of EPDM. For example, the vulcanizable composition including the EPDM can be prepared using low Mooney EPDM or a blend including low Mooney EPDM as describe herein. For example, vulcanizable composition including the expandable graphite may use an EPDM blend that includes from about 2 to about 40 wt. %, in other embodiments from about 3 to about 20 wt. %, and in other embodiments from about 5 to about 12 wt. % of an EPDM characterized by a Mooney viscosity of less than 60, in other embodiments less than 55, in other embodiments less than 50, in other embodiments less than 45, in other embodiments less than 40, in other embodiments less than 35, with the balance of the rubber component including EPDM characterized by a Mooney viscosity of 60 or higher. In one or more embodiments, the second vulcanizable composition that is prepared with the expandable graphite, and subsequently mixed with the first composition, may be prepared using only EPDM characterized by a Mooney viscosity of 60 or higher.

In those embodiments where one layer of a multi-layered membrane is devoid or substantially devoid of expandable graphite, the vulcanizable composition employed to fabricate this layer can be prepared as described herein absent the expandable graphite, or procedures otherwise known in the art can be employed. The skilled person will appreciate that the respective vulcanizable compositions can then be respectively prepared into sheets (calendered sheets) and then laminated together as described below.

In one or more embodiments, the sulfur cure package (sulfur/accelerator) can be added near the end of the mixing cycle and at lower temperatures to prevent premature crosslinking of the EPDM polymer chains.

In one or more embodiments, the mixing step may include the use of multiple apparatus or sub steps. For example, cooling of the composition may take place on one or more mills. Mills may also be used to warm the composition prior to further mixing within a mixer or extruder. In certain embodiments, the composition may be passed through and extruder and, for example, optionally screened, to remove impurities that could have a deleterious impact on calendaring. Further mixing and dispersion of the non-rubber ingredients may also be accomplished in an extruder.

Once mixed, the vulcanizable composition can then be formed into a sheet by using standard techniques such as calendering or extrusion. The sheet may also be cut to a desired dimension. In one or more embodiments, the vulcanizable mixture can be sheeted to thicknesses ranging from 5 to 200 mils, or in other embodiments from 35 to 90 mils, by using conventional sheeting methods, for example, milling, calendering or extrusion. In one or more embodiments, the admixture is sheeted to at least 40 mils (0.040-inches), which is the minimum thickness specified in manufacturing standards established by the Roofing Council of the Rubber Manufacturers Association (RMA) for non-reinforced EPDM rubber sheets for use in roofing applications. In other embodiments, the vulcanizable mixture is sheeted to a thickness of about 45 mils, which is the thickness for a large percentage of "single-ply" roofing membranes used commercially. In one or more embodiments, the calendered sheeting itself should show good, uniform release from the upper and lower calendar rolls and have a smooth surface appearance (substantially free of bubbles, voids, fish eyes, tear drops, etc.). It should also have uniform release from the suction (vacuum) caps at the splicing table and uniform surface dusting at the dust box.

As suggested above, the membranes of the present invention, which referred to as single-ply membranes or panels, may nonetheless include multiple sheets of EPDM that are co-cured into a single panel or sheet. The panel can be optionally reinforced with scrim. In other embodiments, the membranes are devoid of scrim. The multi-layered membrane (also referred to as a panel) can be constructed or fabricated within a laminating step whereby two or more calendered sheets of green (i.e. uncured) EPDM rubber, optionally together with a reinforcing scrim, are mated by using laminating techniques to produce a green membrane panel.

Once a green membrane panel is prepared, the green panel may be prepared for curing by adding release agents to at least one planar surface of the panel. The release agents, which may include talc, mica, cellulose, and the like, served to prevent sticking and ultimate adhesion of the sheet after winding, especially during curing, which typically takes place while the sheet is in a wound state. Techniques for preparing the green membrane panel for subsequent curing are generally known in the art as described, for example, in U.S. Publ. No. 2010/0205896, which is incorporated herein by reference. In other embodiments, a curing sheet or liner may be employed whereby a protective liner in rolled with the sheet to prevent the sheet from curing to itself. In any event, the green membrane panel can be wound onto a curing roll within, for example, a winding step.

Once wound, the green membrane panel can undergo curing with a curing step. In one or more embodiments, vulcanization may take place in an autoclave. Where an in-line process is used, curing may take place by hot air or by rotary cure. In one or more embodiments, vulcanization of the EPDM sheet may take place at temperatures of at least 150° C., in other embodiments at least 155° C., in other embodiments at least 160° C., and in other embodiments at least 165° C. In these or other embodiments, vulcanization may take place at temperatures of from about 130 to about 160, or in other embodiments from about 140 to about 155, or in other embodiments from about 145 to about 150° C. In one or more embodiments, vulcanization may take place at increased pressures. For example, vulcanization may take place at pressures of at least 1.5, in other embodiments at least 2.0, in other embodiments at least 2.5, in other embodiments at least 3.0, and in other embodiments at least 3.5 atmospheres.

The sheeting can be visually inspected and cut to the desired length and width dimensions after curing with a final fabrication step. Generally speaking, the membrane may be unrolled after curing, inspected and cut to a desired length and width, optionally enhanced with a tape and/primer layer, and then ultimately rolled for storage and shipping. For various fabrication techniques, reference can be made to U.S. Publ. Nos. 2007/0137777, which is incorporated herein by reference.

In one or more embodiments, the expandable graphite employed in preparing the EPDM membranes of the present invention may be selected based upon the peak mixing temperature of the composition during any step employed in preparing the membrane panel wherein the expandable graphite is present in the composition. This would include the peak temperature during preparation of the vulcanizable composition, milling, extrusion, calendering, winding, and curing. In one or more embodiments, the expandable graphite is selected based upon an onset temperature that is at least 1° C., in other embodiments at least 3° C., in other embodiments at least 5° C., in other embodiments at least 10° C., and in other embodiments at least 15° C. higher than the highest or peak temperature of the composition during each of these respective steps while the composition includes the expandable graphite.

The roof sheeting membranes can be evaluated for physical properties using test methods developed for mechanical rubber goods. Typical properties include, among others, tensile strength, modulus, ultimate elongation, tear resistance, ozone resistance, water absorption, burn resistivity, and cured compound hardness.

Membrane Performance Standards

In one or more embodiments, the membranes of the invention demonstrate burn resistivity that meets or exceeds standards of flame spread such as tested by UL 94 and/or UL 790. Further, the membranes of the invention meet standards of resistance to wind uplift as tested in accordance with test method UL 1897. In these or other embodiments, the membranes of the present invention meet the performance standards of ASTM D 4637.

Membrane Installation

The membranes of this invention may be unrolled over a roof substructure in a conventional fashion, wherein the seams of adjacent sheets are overlapped and mated by using, for example, an adhesive. The width of the seam can vary depending on the requirements specified by the architect, building contractor, or roofing contractor, and they thus do not constitute a limitation of the present invention. Seams can be joined with conventional adhesives such as, for instance, a butyl-based lap splice adhesive, which is commercially available from Firestone Building Products Company as SA-1065. Application can be facilitated by spray, brush, swab or other means known in the art. Also, field seams can be formed by using tape and companion primer such as QuickSeam™ tape and Quick Prime Plus primer, both of which are commercially available from Firestone Building Products Company of Carmel, Ind.

Also, as is known in the art, these membranes can be secured to the roof substructure by using, for example, mechanical fasteners, adhesives (which are often employed to prepare a fully-adhered roofing system), or ballasting. Furthermore, the membranes of this invention are useful in combination with insulation or coverboards or in composite boards as disclosed in U.S. Pat. No. 7,972,688, which is incorporated herein by reference. It is also contemplated to use the concepts of the present invention in EPDM flashings such as those disclosed in U.S. Pat. No. 5,804,661, which is also incorporated herein by reference.

In certain embodiments, the polymeric composition is devoid of flame retardants other than expandable graphite.

In order to demonstrate the practice of the present invention, the following examples have been prepared and tested. The examples should not, however, be viewed as limiting the scope of the invention. The claims will serve to define the invention.

EXAMPLES

Samples 1-4

Four non-black rubber formulations were prepared and tested for processing properties. Each rubber formulation included EPDM polymer together with the following ingredients, which amounts are based upon 100 parts by weight of the rubber: about 51 parts by weight (pbw) silica, about 58 pbw titanium dioxide, about 59 pbw oil, about 2 pbw hydrocarbon wax, about 5 pbw polyethylene wax, about 5 pbw zinc oxide, about 3.25 pbw stearic acid, about 2 pbw silane coupling agent, about 1.5 pbw sulfur, about 1.5 pbw of a dithiocarbamate accelerator, and about 0.3 pbw of a thiazole accelerator, as well as those additional ingredients provided in Table I (the ingredients are provided in parts by weight). The formulations were mixed by employing a two-step mixing procedure wherein the curative, accelerators, and a portion of the stearic acid were added in a second, low-temperature mixing step.

TABLE I

| Ingredient | Sample 1 | Sample 2 | Sample 3 | Sample 4 |
| --- | --- | --- | --- | --- |
| Talc | 41 | | | |
| Expandable Graphite I | | 41 | | |
| Expandable Graphite II | | | 41 | |

TABLE I-continued

| Ingredient | Sample 1 | Sample 2 | Sample 3 | Sample 4 |
|---|---|---|---|---|
| Expandable Graphite III | | | | 41 |
| Processing properties | | | | |
| S' (MH-ML)dNm | 7.22 | 6.03 | 4.06 | 5.65 |
| tc10 | 3.7 | 3 | 1.1 | 5.6 |
| tc50 | 15 | 17 | 15 | 18 |
| tc90 | 38 | 39 | 38 | 39 |

Expandable Graphite I was obtained under the tradename Asbury 1721 graphite (Asbury Carbons) and was characterized by a particle size (nominal size, U.S. Sieve) of 20×50, corresponding to particles having a nominal size greater than 300 μm, a pH of about 1 to about 6, an expansion ratio of 290 to 1 (cc/g), and an on-set expansion temperature of about 200° C. Expandable Graphite II was obtained under the tradename Asbury 3772 graphite (Asbury Carbons) and was characterized by a particle size (nominal size, U.S. Sieve) of 20×50, corresponding to particles having a nominal size greater than 300 μm, a pH of about 5 to about 10, an expansion ratio of 290 to 1 (cc/g), and an on-set expansion temperature of about 200° C. Expandable Graphite III was obtained under the tradename Asbury 3626 graphite (Asbury Carbons) and was characterized by a particle size (nominal size, U.S. Sieve) of 60×200, corresponding to particles having a nominal size greater than 75 μm, a pH of about 5 to about 10, an expansion ratio of 150 to 1 (cc/g), and an on-set expansion temperature of about 105° C.

The processing properties of each composition were evaluated within a Rubber Processing Analyzer set at 160° C. for 45 minutes at 100 cycles per minute and 0.5 deg. The analyzer was set to mimic a moving dirheometer (MDR) at 1.1. The results of the test data are provided in Table I.

Samples 5-16

Twelve additional non-black EPDM samples were prepared in a similar fashion to those samples provided in Table I. These samples were cured into test specimens for mechanical testing according to ASTM D 412, puncture testing according to ASTM D 4833, die C tear testing, as well as cured 6"×6" samples for burn resistivity testing. Specifically, the burn resistivity testing included stapling the rubber sample to a half-inch ISO board on a sample holder that places the membrane and ISO board at a 45 degree angle to the ground. A propane torch with a two-inch flame is positioned such that the flame contacts the end of the membrane. The flame is applied for two minutes and care is taken so that the flame does not contact the ISO board. The burn resistivity of the membrane was visually observed and ranked in numerical fashion from 1 to 5, with 5 representing those membranes providing the best burn resistivity. The ability of the membrane to self-extinguish was also determined by visual inspection and the self-extinguishing nature of the membrane is recorded in Table II.

The relevant ingredients employed in each sample, together with the results of the testing, are provided in Table II.

TABLE II

| Ingredient | Sample 5 | Sample 6 | Sample 7 | Sample 8 | Sample 9 | Sample 10 | Sample 11 | Sample 12 | Sample 13 | Sample 14 | Sample 15 | Sample 16 |
|---|---|---|---|---|---|---|---|---|---|---|---|---|
| Talc | 41 | 20 | — | — | — | — | — | — | — | — | 29 | — |
| Expandable Graphite I | — | 20 | 41 | 70 | 97 | 156 | 220 | 361 | 20 | 10 | 10 | 6 |
| Expandable Graphite II | — | — | — | — | — | — | — | — | — | — | — | — |
| Expandable Graphite III | — | — | — | — | — | — | — | — | — | — | — | — |
| Testing | | | | | | | | | | | | |
| Mooney Scorch | | | | | | | | | | | | |
| Min. Viscosity | 29.9 | 27.1 | 31.6 | 31.3 | 33.7 | 41.3 | 24.7 | — | 24.9 | 23.1 | 26.2 | 23 |
| T5 Minutes | 45.7 | — | — | — | 59.6 | 42.1 | 51.1 | — | — | — | — | — |
| T35 Minutes | — | — | — | — | — | — | — | — | — | — | — | — |
| ASTM 412 Mechanical Properties (unaged) | | | | | | | | | | | | |
| 100% Modulus (psi) | 215 | 268 | 257 | 269 | 279 | 309 | — | — | 205 | 194 | 223 | 174 |
| Tensile Strength (psi) | 1244 | 953 | 1091 | 660 | 477 | 387 | 238 | 354 | 952 | 1347 | 1094 | 1154 |
| Elongation (%) | 948 | 813 | 827 | 755 | 554 | 412 | 40 | 32 | 977 | 975 | 967 | 945 |
| ASTM Die C Tear (unaged) | | | | | | | | | | | | |
| MD Load Thickness @ Max Load (lb f/in) | 207 | 142 | 158 | 162 | 165 | 133 | 85 | 94 | 159 | 162 | 164 | 156 |
| ASTM D-4833 Puncture (unaged) | | | | | | | | | | | | |
| Average Max Load (lb f) | 19.2 | 25 | 12 | 13 | 11 | 13 | — | 13 | 14 | 16 | 13 | 16 |
| Burn Resistivity (1-5, with 5 being the best) | 1 | 4 | 4 | 4 | 4 | 4 | 5 | 5 | 3 | 3 | 4 | 2 |
| Self-Extinguishing | No | Yes | Yes | Yes | Yes | Yes | Yes | Yes | Yes | Yes | Yes | Yes |

Samples 17-21

Five black EPDM samples were prepared and tested for physical properties as well as burn resistivity and self-extinguishing properties. Each formulation included EPDM polymer and the following ingredients based upon 100 parts by weight (pbw) of the rubber: 117 pbw carbon black, 45 pbw talc, 67 pbw oil, 5 pbw zinc oxide, 2 pbw stearic acid, 1.3 pbw sulfur, 0.2 pbw of a thiuram accelerator, and 3.6 pbw of a benzothiazole sulfenamide accelerator, as well as those additional ingredients provided in Table III. The formulation was mixed by using a two-step mixing procedure where the curative and accelerators were mixed in a low temperature mixing stage. The results of the physical testing and burn resistivity testing are provided in Table III.

TABLE III

| Ingredient | Sample 17 | Sample 18 | Sample 19 | Sample 20 | Sample 21 |
|---|---|---|---|---|---|
| Expandable Graphite I | 64 | 30 | 45 | — | — |
| Expandable Graphite II | — | — | — | 64 | — |
| Expandable Graphite III | — | — | — | — | 64 |
| Testing Mooney Scorch | | | | | |
| Min. Viscosity | 52.6 | 48.0 | 56.4 | 50.3 | 50.1 |
| T5 Minutes | 36.6 | 37.7 | 29.7 | 36.9 | 38.8 |
| T35 Minutes | — | — | 49.7 | — | — |
| ASTM 412 Mechanical Properties (unaged) | | | | | |
| 100% Modulus (psi) | 548 | 578 | 547 | 567 | 589 |
| Tensile Strength (psi) | 1164 | 976 | 794 | 1047 | 1121 |
| Elongation (%) | 348 | 266 | 248 | 299 | 346 |
| ASTM Die C Tear (unaged) | | | | | |
| MD Load Thickness @ Max Load (lb f/in) | 206 | 210 | 188 | 204 | 202 |
| ASTM D-4833 Puncture (unaged) | | | | | |
| Average Max Load (lb f) | 28.1 | 34.8 | 25.3 | 27.1 | 29.7 |
| Burn Resistivity (1-5, with 5 being the best) | 3 | 5 | 3 | 5 | 3 |
| Self-Extinguishing | Yes | Yes | Yes | Yes | Yes |

Various modifications and alterations that do not depart from the scope and spirit of this invention will become apparent to those skilled in the art. This invention is not to be duly limited to the illustrative embodiments set forth herein.

What is claimed is:

1. A method of preparing an EPDM roofing membrane panel, the method comprising:

(i) preparing a first vulcanizable composition that excludes expandable graphite by mixing an EPDM rubber at a first peak temperature;

(ii) preparing a second vulcanizable composition including expandable graphite by mixing an EPDM rubber and expandable graphite at a second peak temperature, where the expandable graphite has an onset temperature of at least 180° C., and wherein the second vulcanizable composition includes an EPDM blend that includes from about 2 to about 40 wt. % of an EPDM characterized by a Mooney viscosity (ML1+4@125° C.) of less than 60 with the balance of the EPDM blend includes an EPDM characterized by a Mooney viscosity (ML1+4@125° C.) of 60 or higher;

(iii) combining and mixing the first vulcanizable composition with the second vulcanizable composition and a cure system at a third peak temperature to form a combined vulcanizable composition;

(iv) forming a sheet from said combined vulcanizable composition;

(v) preparing a green membrane panel using said sheet; and (vi) curing said green membrane panel to form the EPDM roofing membrane panel, where said first peak temperature is higher than said second peak temperature and said second peak temperature is higher than said third peak temperature, where the first vulcanizable composition includes a first EPDM and where the second vulcanizable composition includes a second EPDM, and where the Mooney viscosity ($ML_{1+4}$@125° C.) of the second EPDM is lower than the Mooney viscosity ($ML_{1+4}$@125° C.) of the first EPDM.

2. The method of claim 1, where the EPDM rubber used to prepare the first vulcanizable composition is characterized by a Mooney viscosity ($ML_{1+4}$@125° C.) of 60 or higher.

* * * * *